(12) United States Patent
Lavoie et al.

(10) Patent No.: US 10,232,673 B1
(45) Date of Patent: Mar. 19, 2019

(54) TIRE PRESSURE MONITORING WITH VEHICLE PARK-ASSIST

(71) Applicant: Ford Global Technologies, LLC, Dearborn, MI (US)

(72) Inventors: Erick Michael Lavoie, Dearborn, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/996,022

(22) Filed: Jun. 1, 2018

(51) Int. Cl.
  *B60C 23/00* (2006.01)
  *B60C 23/02* (2006.01)
  *B60C 23/04* (2006.01)
  *B62D 15/02* (2006.01)
  *G08G 1/16* (2006.01)

(52) U.S. Cl.
  CPC ...... *B60C 23/0408* (2013.01); *B62D 15/0285* (2013.01); *B62D 15/028* (2013.01); *G08G 1/165* (2013.01); *G08G 1/168* (2013.01)

(58) Field of Classification Search
  CPC ... B60C 23/02; B60C 23/0408; B60C 23/061; B60W 30/00; G06F 17/00
  See application file for complete search history.

(56) References Cited

U.S. PATENT DOCUMENTS

| | | | |
|---|---|---|---|
| 6,683,539 B2 | 1/2004 | Trajkovic | |
| 6,724,322 B2 | 4/2004 | Tang | |
| 6,801,855 B1 | 10/2004 | Walters | |
| 6,850,844 B1 | 1/2005 | Walters | |
| 6,850,148 B2 | 2/2005 | Masudaya | |
| 6,927,685 B2 | 8/2005 | Wathen | |
| 7,042,332 B2 | 5/2006 | Takamura | |
| 7,123,167 B2 | 10/2006 | Staniszewski | |
| 7,663,508 B2 | 2/2010 | Teshima | |
| 7,813,844 B2 | 10/2010 | Gensler | |
| 7,834,778 B2 | 11/2010 | Browne | |
| 7,850,078 B2 | 12/2010 | Christenson | |

(Continued)

FOREIGN PATENT DOCUMENTS

| | | | |
|---|---|---|---|
| CN | 105774691 A | 7/1916 | |
| CN | 101929921 A | 12/2010 | |

(Continued)

OTHER PUBLICATIONS

US 9,772,406, 09/2017, Liu (withdrawn)

(Continued)

*Primary Examiner* — Hoi C Lau
(74) *Attorney, Agent, or Firm* — James P. Muraff; Neal, Gerber & Eisenberg LLP (57) ABSTRACT

Method and apparatus are disclosed for tire pressure monitoring with vehicle park-assist. An example vehicle includes tires, tire pressure monitoring system (TPMS) sensors, a park-assist controller to determine a parking path, and a TPMS controller. The TPMS controller is to determine tire characteristics based on the parking path, calculate tire indexes for the tires based on the tire characteristics, and select one or more of the TPMS sensors based on the tire indexes. The TPMS controller also is to instruct, via a communication module, the selected TPMS sensors to collect pressure measurements during park-assist.

20 Claims, 5 Drawing Sheets

(56) References Cited

U.S. PATENT DOCUMENTS

| | | |
|---|---|---|
| 8,035,503 B2 | 10/2011 | Partin |
| 8,054,169 B2 * | 11/2011 | Bettecken ........... B60C 23/0408 340/442 |
| 8,126,450 B2 | 2/2012 | Howarter |
| 8,180,524 B2 | 5/2012 | Eguchi |
| 8,224,313 B2 | 7/2012 | Howarter |
| 8,335,598 B2 | 12/2012 | Dickerhoof |
| 8,538,408 B2 | 9/2013 | Howarter |
| 8,692,773 B2 | 4/2014 | You |
| 8,706,350 B2 | 4/2014 | Talty |
| 8,725,315 B2 | 5/2014 | Talty |
| 8,933,778 B2 | 1/2015 | Birkel |
| 8,994,548 B2 | 3/2015 | Gaboury |
| 8,995,914 B2 | 3/2015 | Nishidai |
| 9,008,860 B2 | 4/2015 | Waldock |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,225,531 B2 | 12/2015 | Hachey |
| 9,273,966 B2 * | 3/2016 | Bartels ................. G01C 21/165 |
| 9,302,675 B2 | 4/2016 | Schilling |
| 9,318,022 B2 | 4/2016 | Barth |
| 9,379,567 B2 | 6/2016 | Kracker |
| 9,429,657 B2 | 8/2016 | Sidhu |
| 9,429,947 B1 | 8/2016 | Wengreen |
| 9,469,247 B2 | 10/2016 | Juneja |
| 9,529,519 B2 | 12/2016 | Blumenberg |
| 9,563,990 B2 | 2/2017 | Khan |
| 9,598,051 B2 | 3/2017 | Okada |
| 9,606,241 B2 | 3/2017 | Varoglu |
| 9,651,655 B2 | 5/2017 | Feldman |
| 9,656,690 B2 | 5/2017 | Shen |
| 9,701,280 B2 | 7/2017 | Schussmann |
| 9,712,977 B2 | 7/2017 | Tu |
| 9,715,816 B1 | 7/2017 | Adler |
| 9,731,714 B2 | 8/2017 | Kiriya |
| 9,842,444 B2 | 12/2017 | Van Wiemeersch |
| 9,845,070 B2 | 12/2017 | Petel |
| 9,846,431 B2 | 12/2017 | Petel |
| 9,921,743 B2 | 3/2018 | Bryant |
| 9,946,255 B2 | 4/2018 | Matters |
| 9,975,504 B2 | 5/2018 | Dalke |
| 10,131,347 B2 | 11/2018 | Kim |
| 2005/0030156 A1 | 2/2005 | Alfonso |
| 2006/0227010 A1 | 10/2006 | Berstis |
| 2008/0027591 A1 | 1/2008 | Lenser |
| 2008/0154613 A1 | 6/2008 | Haulick |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 * | 5/2009 | Luke ................... B60C 23/061 701/36 |
| 2009/0125311 A1 | 5/2009 | Haulick |
| 2009/0128315 A1 * | 5/2009 | Griesser ............... B60C 23/061 340/443 |
| 2010/0025942 A1 | 2/2010 | Von Rehyer |
| 2010/0114471 A1 | 5/2010 | Sugiyama |
| 2010/0114488 A1 | 5/2010 | Khamharn |
| 2010/0259420 A1 * | 10/2010 | Von Reyher ......... B62D 15/028 340/932.2 |
| 2011/0071725 A1 | 3/2011 | Kleve |
| 2012/0323700 A1 | 12/2012 | Aleksandrovich |
| 2013/0124061 A1 * | 5/2013 | Khanafer ............... G06F 17/00 701/70 |
| 2013/0145441 A1 | 6/2013 | Mujumdar |
| 2013/0317944 A1 | 11/2013 | Huang |
| 2014/0096051 A1 | 4/2014 | Boblett |
| 2014/0222252 A1 | 8/2014 | Matters |
| 2014/0300504 A1 * | 10/2014 | Shaffer ................. G01S 13/86 342/27 |
| 2014/0365126 A1 | 12/2014 | Vulcano |
| 2015/0022468 A1 | 1/2015 | Cha |
| 2015/0039224 A1 | 2/2015 | Tuukkanen |
| 2015/0127208 A1 | 5/2015 | Jecker |
| 2015/0153178 A1 | 6/2015 | Koo |
| 2015/0163649 A1 | 6/2015 | Chen |
| 2015/0203111 A1 | 7/2015 | Bonnet |
| 2015/0220791 A1 | 8/2015 | Wu |
| 2015/0226146 A1 | 8/2015 | Elwart |
| 2015/0274016 A1 | 10/2015 | Kinoshita |
| 2015/0344028 A1 * | 12/2015 | Gieseke ................ B60W 30/00 701/1 |
| 2015/0375741 A1 | 12/2015 | Kiriya |
| 2016/0090055 A1 | 3/2016 | Breed |
| 2016/0112846 A1 | 4/2016 | Siswick |
| 2016/0114726 A1 | 4/2016 | Nagata |
| 2016/0139244 A1 | 5/2016 | Holtman |
| 2016/0144857 A1 | 5/2016 | Ohshima |
| 2016/0153778 A1 * | 6/2016 | Singh ...................... G06T 7/60 701/36 |
| 2016/0170494 A1 | 6/2016 | Bonnet |
| 2016/0207528 A1 | 7/2016 | Stefan |
| 2016/0272244 A1 | 9/2016 | Imai |
| 2016/0282442 A1 | 9/2016 | O'Mahony |
| 2016/0349362 A1 | 10/2016 | Rohr |
| 2016/0321445 A1 | 11/2016 | Turgeman |
| 2016/0355125 A1 | 12/2016 | Herbert |
| 2016/0358474 A1 | 12/2016 | Uppal |
| 2016/0371691 A1 | 12/2016 | Kang |
| 2017/0008563 A1 | 1/2017 | Popken |
| 2017/0026198 A1 | 1/2017 | Ochiai |
| 2017/0032593 A1 | 2/2017 | Patel |
| 2017/0076603 A1 | 3/2017 | Bostick |
| 2017/0168479 A1 | 6/2017 | Dang |
| 2017/0192428 A1 | 7/2017 | Vogt |
| 2017/0208438 A1 | 7/2017 | Dickow |
| 2017/0297385 A1 * | 10/2017 | Kim ...................... B60C 23/02 |
| 2017/0301241 A1 | 10/2017 | Urhahne |
| 2017/0308075 A1 | 10/2017 | Whitaker |
| 2018/0024559 A1 | 1/2018 | Seo |
| 2018/0029591 A1 | 2/2018 | Lavoie |
| 2018/0039264 A1 | 2/2018 | Messner |
| 2018/0043884 A1 | 2/2018 | Johnson |
| 2018/0056939 A1 | 3/2018 | van Roermund |
| 2018/0194344 A1 | 7/2018 | Wang |
| 2018/0236957 A1 | 8/2018 | Min |

FOREIGN PATENT DOCUMENTS

| | | |
|---|---|---|
| CN | 103818204 A | 5/2014 |
| CN | 104485013 A | 4/2015 |
| CN | 103049159 B | 7/2015 |
| CN | 105513412 A | 4/2016 |
| CN | 105588563 A | 5/2016 |
| CN | 105599703 A | 5/2016 |
| CN | 106027749 A | 10/2016 |
| CN | 205719000 U | 11/2016 |
| CN | 106598630 A | 4/2017 |
| CN | 104290751 B | 1/2018 |
| DE | 19817142 A1 | 10/1999 |
| DE | 19821163 A1 | 11/1999 |
| DE | 102012008858 A1 | 11/2012 |
| DE | 102010034129 B4 | 10/2013 |
| DE | 102012222972 A1 | 6/2014 |
| DE | 102014009077 A1 | 2/2015 |
| DE | 102013019904 A1 | 5/2015 |
| DE | 102014007915 A1 | 12/2015 |
| DE | 102014011802 A1 | 2/2016 |
| DE | 102014111570 A1 | 2/2016 |
| DE | 102014015655 A1 | 4/2016 |
| DE | 102015209976 A1 | 12/2016 |
| DE | 102016011916 A1 | 6/2017 |
| DE | 102016125282 A1 | 7/2017 |
| EP | 2135788 B1 | 6/2017 |
| GB | 2517835 A | 3/2015 |
| JP | 2000293797 A | 10/2000 |
| JP | 2004142543 A | 5/2004 |
| JP | 2004287884 A | 10/2004 |
| JP | 2005193742 A | 7/2005 |
| JP | 2014134082 A | 7/2014 |

(56) References Cited

FOREIGN PATENT DOCUMENTS

| | | |
|---|---|---|
| JP | 5586450 B2 | 9/2014 |
| JP | 2016119032 A | 6/2016 |
| KR | 20160039460 A | 4/1916 |
| KR | 20100006714 A | 1/2010 |
| KR | 20130106005 A | 9/2013 |
| WO | WO 2013/123813 A1 | 8/2013 |
| WO | WO 2015/068032 A1 | 5/2015 |
| WO | WO 2015/193058 A1 | 12/2015 |
| WO | WO 2016/046269 A1 | 3/2016 |
| WO | WO 2016/134822 A1 | 9/2016 |
| WO | WO 2017/062448 A1 | 4/2017 |
| WO | WO 2017/096307 A1 | 6/2017 |
| WO | WO 2017/096728 A1 | 6/2017 |
| WO | WO 2017/097942 A1 | 6/2017 |
| WO | WO 2017/118510 A1 | 7/2017 |

OTHER PUBLICATIONS

Search Report dated Oct. 10, 2018 for GB Patent Application No. 1806499.8 (4 pages).
Tesla Model S Owner's Manual v2018.44. Oct. 29, 2018.
Land Rover develops a smartphone remote control for its SUVs, James Vincent, Jun. 18, 2015.
Al-Sherbaz, Ali et al., Hybridisation of GNSS with other wireless/sensors technologies on board smartphones to offer seamless outdoors-indoors positioning for LBS applications, Apr. 2016, 3 pages.
Jingbin Liu, IParking: An Intelligent Indoor Location-Based Smartphone Parking Service, Oct. 31, 2012, 15 pages.

\* cited by examiner

TIRE PRESSURE MONITORING WITH VEHICLE PARK-ASSIST

TECHNICAL FIELD

The present disclosure generally relates to vehicle park-assist and, more specifically, to tire pressure monitoring with vehicle park-assist.

BACKGROUND

Many vehicles include motive functions that are at least partially autonomously controlled by the vehicle. For instance, some vehicles include cruise control in which the vehicle controls acceleration and/or deceleration of the vehicle so that a speed of the vehicle is maintained. Some vehicles also include park-assist features in which the vehicle autonomously controls motive functions of the vehicle to park the vehicle into a parking spot. Moreover, some vehicles have implemented tire pressure monitoring systems that monitor tire pressures and/or other characteristics of the tires. For instance, a vehicle may include a tire pressure sensor for each tire of the vehicle to enable each of the tires to be monitored.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for tire pressure monitoring with vehicle park-assist. An example disclosed vehicle includes tires, tire pressure monitoring system (TPMS) sensors, a park-assist controller to determine a parking path, and a TPMS controller. The TPMS controller is to determine tire characteristics based on the parking path, calculate tire indexes for the tires based on the tire characteristics, and select one or more of the TPMS sensors based on the tire indexes. The TPMS controller also is to instruct, via a communication module, the selected TPMS sensors to collect pressure measurements during park-assist.

An example disclosed method includes determining, via a processor, a parking path for a vehicle. The example disclosed method also includes determining tire characteristics of tires of the vehicle based on the parking path, calculating a tire index for each of the tires based on the tire characteristics, and selecting one or more of the TPMS sensors based on the tire indexes. The example disclosed method also includes instructing, via a communication module, the selected TPMS sensors to collect pressure measurements during park-assist.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles typically include tires that are coupled to respective wheel rims. Generally, the tires are formed of rubber (e.g., synthetic rubber, natural rubber), fabric, wiring, and/or other materials and chemical compounds. Recently, vehicles have implemented tire pressure monitoring systems (TPMS) that monitor tire pressures and/or other characteristics of the tires. For instance, a vehicle may include a tire pressure sensor for each tire of the vehicle to enable each of the tires to be monitored.

Further, many vehicles include motive functions that are at least partially autonomously controlled by the vehicle. Some vehicles include cruise control in which the vehicle controls acceleration and/or deceleration of the vehicle so that a speed of the vehicle is maintained. Further, some vehicles include park-assist features in which the vehicle autonomously controls motive functions of the vehicle to park the vehicle into a parking spot. For instance, some vehicles utilize remote park-assist systems that are configured to enable a vehicle operator (e.g., a driver) to remotely initiate the vehicle to autonomously park itself from a position outside a cabin of the vehicle. In some instances, characteristics of tires of the vehicle, such as tire pressure and tread levels, may potentially affect handling of the vehicle as the vehicle performs (remote) park-assist functions.

In some instances, a TPMS system of a vehicle may attempt to collect tire pressure measurements while remote park-assist signals are being sent to and/or from the vehicle, thereby potentially resulting in a reduction of ht etire sensor battery state of charge and a greater amount of wireless traffic that affects (e.g., slows down, interrupts, stops, etc.) throughout performance of one or more vehicle features (e.g., a remote park-assist motive feature). Example methods and apparatus disclosed herein reduce the ire sensor battery usage and the amount of wireless traffic resulting from monitoring tire pressures while park-assist features are being performed by selecting to collect pressure measurements for only a portion of the tires while park-assist is active.

Examples disclosed herein includes a vehicle system that controls tire pressure monitoring system (TPMS) wireless communication while park-assist (e.g., remote park-assist) is activated. The system requests tire pressure measurements from TPMS sensor(s) of particular tire(s) based upon the particular motive functions being and/or to be performed via park-assist to reduce the amount of wireless traffic data during park-assist activation. For example, the vehicle system determines whether to request a measurement from a TPMS sensor of a particular tire based upon a direction of a turn being performed, a direction of travel, a clearance distance with a nearby object, a road-wheel distance traveled during a park-assist motive function. Further, in some examples, the vehicle system determines whether to request a measurement from a TPMS sensor of a particular tire based upon a charge level of the TPMS sensor. Additionally, or alternatively, the system determines to request a measurement from a TPMS sensor of a particular tire if a previous pressure alert was identified for that tire based on a previous measurement. In some examples, the vehicle normalizes a tire pressure measurement collected by a TPMS sensor to account for a change in the ambient temperature and/or the barometric pressure around the vehicle. Further, in some examples, the vehicle system identifies a rate of pressure loss for a particular tire to determine whether to emit an alert to a user regarding the pressure of that tire.

As used herein, "park-assist" and "vehicle park-assist" refer to a system in which a vehicle operator (e.g., a driver) initiates a vehicle to perform motive functions, without receiving direct steering or velocity input from a driver, to autonomously park the vehicle into a parking spot. For example, the vehicle operator may initiate the vehicle to perform the motive functions for autonomously parking from within and/or outside of a cabin of the vehicle. As used herein, "remote parking," "vehicle remote park-assist," "remote park-assist," and "RePA" refer to a system in which a remote device of a vehicle operator (e.g., a driver) initiates a vehicle to perform motive functions, without receiving direct steering or velocity input from a driver, to autonomously park the vehicle into a parking spot while the vehicle operator is located outside of the vehicle. That is, a remote park-assist system initiates motive functions of a vehicle to remotely park the vehicle into a parking spot upon receiving instructions from a remote device of a vehicle operator.

Figure 1:
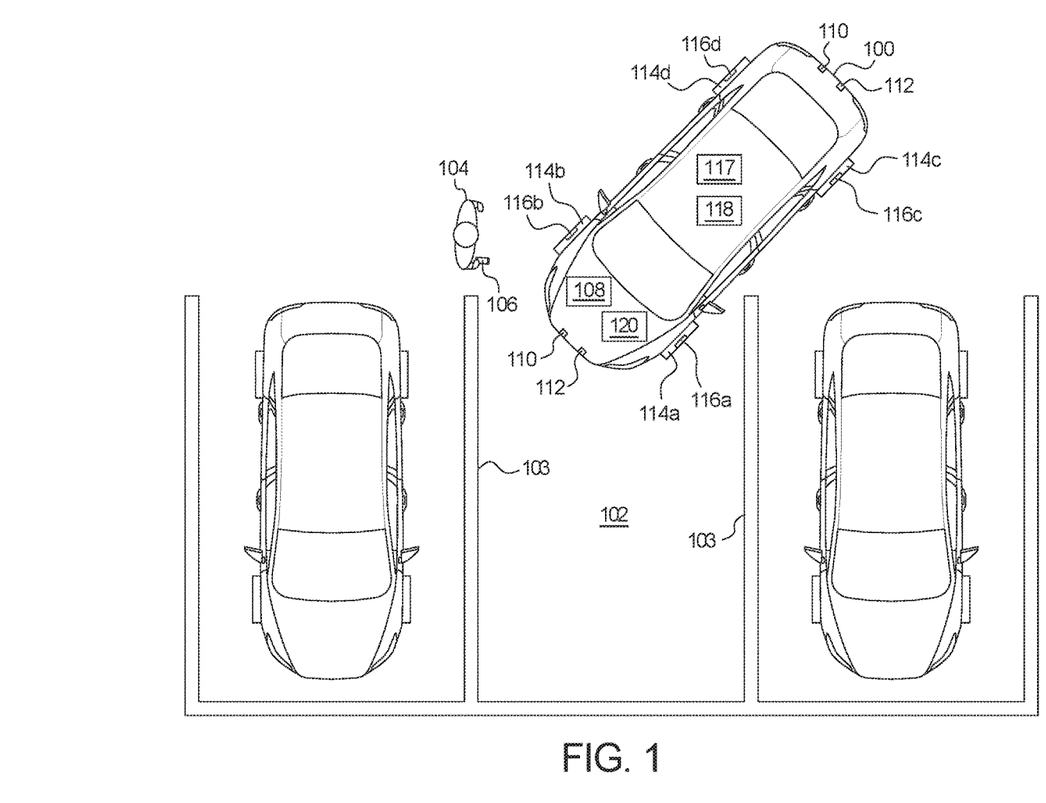
FIG. 1 illustrates an example vehicle and user with a mobile device in accordance with the teachings herein.

Turning to the figures, FIG. 1 illustrates an example vehicle 100 in accordance with the teachings herein. In the illustrated examples, the vehicle 100 is utilizing remote park-assist features to park into a parking spot 102. In the illustrated example, an outer perimeter of the parking spot 102 is defined by road surface markings 103. In other examples, the parking spot 102 may be defined by additional or alternative objects, such as a curb, a wall, a post, an adjacent vehicle, etc. As illustrated in FIG. 1, a user 104 utilizes a mobile device 106 (e.g., a smart phone, a wearable, a smart watch, a tablet, a fob, etc.) to initiate the remote park-assist features of the vehicle 100.

The vehicle 100 of the illustrated example may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be semi-autonomous (e.g., some routine motive functions controlled by the vehicle 100) or autonomous (e.g., motive functions are controlled by the vehicle 100 without direct driver input).

In the illustrated example, the vehicle 100 includes a vehicle communication module 108 that includes wired or wireless network interfaces to enable communication with other devices (e.g., the mobile device 106) and/or external networks. The external network(s) may be a public network, such as the Internet; a private network, such as an intranet; or combinations thereof, and may utilize a variety of networking protocols now available or later developed including, but not limited to, TCP/IP-based networking protocols. Further, the vehicle communication module 108 includes hardware (e.g., processors, memory, storage, antenna, etc.) and software to control the wired or wireless network interfaces. For example, the vehicle communication module 108 includes a wired or wireless interface (e.g., an auxiliary port, a Universal Serial Bus (USB) port, a Bluetooth® wireless node, etc.) to communicatively couple with the mobile device 106 of the user 104. In such examples, the vehicle 100 may communicate with an external network via the mobile device 106. In some examples, the vehicle communication module 108 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the vehicle communication module 108 includes a wireless personal area network (WPAN) module that is configured to wirelessly communicate with the mobile device 106 of the user 104 via short-range wireless communication protocol(s). In some examples, the vehicle communication module 108 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally or alternatively, the vehicle communication module 108 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the vehicle communication module 108 to communicatively couple to the mobile device 106 of the user 104.

As illustrated in FIG. 1, the vehicle 100 also includes proximity sensors 110 and cameras 112. For example, the proximity sensors 110 are configured to collect data that are utilized to detect and locate nearby objects within the surrounding area of the vehicle 100. The proximity sensors 110 include radar sensor(s) that detect and locate objects via radio waves, LIDAR sensor(s) that detect and locate objects via lasers, ultrasonic sensor(s) that detect and locate objects via ultrasound waves, and/or any other sensor(s) that are able to detect and locate nearby objects. Further, the cameras 112 are configured to capture image(s) and/or video of an area surrounding the vehicle 100 that are utilized to detect and locate nearby objects (e.g., the parking spot 102). In the illustrated example, one of the proximity sensors 110 and one of the cameras 112 are front sensing devices that monitor an area in front of the vehicle 100. Additionally, one of the proximity sensors 110 and one of the cameras 112 are rear sensing devices that monitor an area behind the vehicle 100.

The vehicle 100 of the illustrated example also includes tires 114 and tire pressure management system (TPMS) sensors 116. In the illustrated example, the vehicle 100 includes a tire 114a (e.g., a first tire, a front driver-side tire) that is monitored by a TPMS sensor 116a (e.g., a first TPMS sensor, a front driver-side TPMS sensor), a tire 114b (e.g., a second tire, a front passenger-side tire) that is monitored by a TPMS sensor 116b (e.g., a second TPMS sensor, a front passenger-side TPMS sensor), a tire 114c (e.g., a third tire, a rear driver-side tire) that is monitored by a TPMS sensor 116c (e.g., a third TPMS sensor, a rear driver-side TPMS sensor), and a tire 114*d* (e.g., a fourth tire, a rear passenger-side tire) that is monitored by a TPMS sensor 116*d* (e.g., a rear TPMS sensor, a rear driver-side TPMS sensor). That is, each of the tires 114 of the illustrated example includes a corresponding one of the TPMS sensors 116.

The tires 114 of the illustrated example are coupled to respective wheel rims of the vehicle 100. In some examples, the tires 114 are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of the vehicle 100. Further, in some examples, the tires 114 include treads (i.e., grooved patterns) on their outer surfaces to further improve handling during operation of the vehicle 100.

The TPMS sensors 116 of the illustrated example include sensor(s) and circuitry configured to determine tire pressures and/or other characteristics of the tires 114. For example, each of the TPMS sensors 116 include a pressure sensor to collect a pressure measurement and/or a temperature sensor to collect a temperature within the corresponding one of the tires 114. Each of the TPMS sensors 116 include and/or are communicatively coupled to one or more processors and/or memory. Further, each of the TPMS sensors 116 includes circuitry to facilitate wireless communication with the vehicle communication module 108 of the vehicle 100. For example, the TPMS sensors 116 include communication modules that communication with a TPMS communication module 117 of the vehicle 100 via low-frequency signals, high-frequency signals, ultra-high frequency (e.g., 315 MHz and/or 433 MHz) signals, Ultra-Wide Band (UWB) signals, Bluetooth® communication protocol, Bluetooth® Low Energy (BLE) protocol, Wi-Fi communication protocol (e.g., IEEE 802.11 a/b/g/n/ac), etc.

In the illustrated example, the TPMS communication module 117 of the vehicle 100 includes wired or wireless network interfaces to enable communication with the TPMS sensors 116 and/or other devices (e.g., the mobile device 106). Further, the TPMS communication module 117 includes hardware (e.g., processors, memory, storage, antenna, etc.) and software to control the wired or wireless network interfaces. For example, the TPMS communication module 117 includes a wireless interface to communicatively couple with the TPMS sensors 116. In some examples, the vehicle communication module 108 includes a wireless personal area network (WPAN) module that is configured to wirelessly communicate with the TPMS sensors 116 via short-range wireless communication protocol(s). For example, the TPMS communication module 117 implements the Bluetooth® and/or Bluetooth® Low Energy (BLE) protocols. Additionally, or alternatively, the TPMS communication module 117 is configured to wirelessly communicate via low-frequency (e.g., 125 kHz, 134 kHz) signals, high-frequency signals, ultra-high frequency (e.g., 315 MHz and/or 433 MHz) signals, Ultra-Wide Band (UWB) signals, Bluetooth® communication protocol, Wi-Fi communication protocol (e.g., IEEE 802.11 a/b/g/n/ac), etc. In some examples, the TPMS communication module 117 includes a plurality of communication nodes. For example, the TPMS communication module 117 includes a communication node near each of the wheel wells of the vehicle 100 such that each of the TPMS sensors 116 is paired with a respective one of the communication nodes. Further, in some examples, the vehicle communication module 108 includes the TPMS communication module 117, the TPMS communication module 117 includes the vehicle communication module 108, and/or the vehicle communication module 108 and the TPMS communication module 117 are integrally formed together.

In the illustrated example, the vehicle 100 also includes a TPMS controller 118. For example, the TPMS controller 118 is configured to activate, localize, and collect measurements from the TPMS sensors 116 via the TPMS communication module 117 and emit low- and/or high-pressure alert(s) based on the collected tire pressure measurements. That is, the TPMS controller 118 is configured to collect real-time tire pressure measurements from the TPMS sensors 116 via wireless communication and present those tire pressure measurements to the user 104. Further, the TPMS controller 118 is configured to compare the collected tire pressure measurements to tire pressure thresholds and present alert(s) (e.g., a low-pressure alert, a high-pressure alert) to the user 104 based on the comparisons. For example, the TPMS controller 118 presents a low-pressure alert when one or more of the tire pressure measurements is less than a first tire pressure threshold (e.g., a low pressure threshold) and presents a high-pressure alert when one or more of the tire pressure measurements is greater than a second tire pressure threshold (e.g., a high pressure threshold). In some examples, the tire pressure thresholds correspond to a factory-recommended lower limit and/or a factory-recommended upper limit of a tire pressure for the tires 114 and/or the vehicle 100.

To activate the TPMS sensors 116, the TPMS controller 118 establishes communication between the TPMS communication module 117 and the TPMS sensors 116 by pairing the TPMS sensors 116 to the TPMS communication module 117. For example, the TPMS controller 118 pairs the TPMS sensors 116 to the TPMS communication module 117 via LF, UHF, BLE, Bluetooth®, Wi-Fi®, UWB, and/or any other communication protocol. Upon pairing the TPMS sensors 116, the TPMS controller 118 sends an instruction, via the TPMS communication module 117, to the TPMS sensors 116 to collect tire pressure measurements from the tires 114.

Further, the TPMS controller 118 of the illustrated example is configured to localize the tires 114 based on the communication between the TPMS sensors 116 and the TPMS communication module 117. That is, the TPMS controller 118 identifies the location of each of the TPMS sensors 116 and the corresponding tires 114 based on the communication between the TPMS sensors 116 and the TPMS communication module 117. For example, the TPMS controller 118 identifies which of the TPMS sensors 116 is located at a front driver-side wheel well, a front passenger-side wheel well, a rear driver-side wheel well, and a rear passenger-side wheel well. In some examples, the TPMS controller 118 is configured to determine locations of the TPMS sensors 116 based upon received signal strength indicators (RSSIs), time-of-flight, and/or angle-of-arrival of signals sent between the TPMS sensors 116 and communication node(s) of the TPMS communication module 117 located on and/or within the vehicle 100. For example, the TPMS controller 118 may utilize triangulation and/or trilateration to localize the TPMS sensors 116 based upon the RSSIs, time-of-flight, and/or angle-of-arrival of signals sent between the TPMS sensors 116 and a plurality of communication modules of the TPMS communication module 117. In other examples, the TPMS communication module 117 may include a communication node near each of the wheel wells of the vehicle 100. In such examples, each of the TPMS sensors 116 is paired with a respective one of the communication nodes, thereby enabling the TPMS communication module 117 to localize each of the TPMS sensors 116.

Oftentimes, when the vehicle 100 is moving, the TPMS sensors 116 are in an active mode during which the TPMS sensors 116 collect tire pressure measurements at a high rate with short intervals (e.g., once every minute) to enable the TPMS sensors 116 to quickly detect a drop in air pressure of the tires 114. For example, by collecting tire pressure measurements at short intervals, the TPMS sensors 116 are able to detect a puncture to one of the tires 114 while the vehicle 100 is traveling along a road. Upon collecting the tire pressure measurements, the TPMS sensors 116 send the tire pressure measurements to the TPMS controller 118 via the TPMS communication module 117 of the vehicle 100.

Further, the vehicle 100 of the illustrated example includes a park-assist controller 120 that is utilized to control park-assist features of the vehicle 100. For example, the park-assist controller 120 is configured to receive, via the vehicle communication module 108, instructions from the mobile device 106 of the user 104 to initiate performance of remote park-assist feature(s) of the vehicle 100. Based on the instructions received from the mobile device 106, the park-assist controller 120 identifies the parking spot 102 near the vehicle 100 based upon data collected by the proximity sensors 110 and/or image(s) and/or video captured by the cameras 112. Further, the park-assist controller 120 identifies one or more target positions to park the vehicle 100 within the parking spot 102. Further, the park-assist controller 120 is configured to determine a parking path from a current position of the vehicle 100 to the target position within the parking spot 102. For example, the park-assist controller 120 determines a target position and/or a corresponding parking path based upon the characteristics of the vehicle 100 (e.g., size, current location, minimum turning radius, etc.) and/or characteristics of a surrounding environment (e.g., identified via the data collected by the proximity sensors 110 and/or the image(s) and/or video captured by the cameras 112). That is, the proximity sensors 110 and the cameras 112 enable the park-assist controller 120 to determine a target parking position and/or a corresponding parking path. Subsequently, the park-assist controller 120 causes the vehicle 100 to perform autonomous remote park-assist motive functions to park the vehicle 100 in the target position. In some examples, the park-assist controller 120 continues to perform remote park-assist motive functions only if the mobile device 106 continues to provide instructions to initiate such functions. That is, the mobile device 106 continuously provides instructions to the park-assist controller 120 while the park-assist controller 120 performs the motive functions.

To reduce the amount of wireless traffic resulting from monitoring tire pressures while remote park-assist is being performed, the TPMS controller 118 selects to collect tire pressure measurement(s) from a portion of the TPMS sensors 116 while a park-assist event is being performed for the vehicle 100. That is, by causing only selected one(s) of the TPMS sensors 116 to collect tire pressure measurement(s) during park-assist, the TPMS controller 118 reduces an amount of wireless communication being transmitted while the park-assist is active.

In operation, the park-assist controller 120 monitors for an available parking spot (e.g., the parking spot 102 of FIG. 1) upon park-assist being activated by the user 104. Once the park-assist controller 120 identifies the parking spot 102, the park-assist controller 120 determines a parking path into the parking spot 102. For example, the park-assist controller 120 determines the parking path based upon characteristics of the vehicle 100 (e.g., size, current location, minimum turning radius, etc.), characteristics of the parking spot 102 (e.g., identified based upon data collected by the proximity sensors 110, image(s) and/or video collected by the cameras 112), and/or characteristics of nearby objects (e.g., identified based upon data collected by the proximity sensors 110, image(s) and/or video collected by the cameras 112).

The TPMS controller 118 of the illustrated example determines tire characteristic(s) of the tires 114 of the vehicle 100 based upon the parking path that was determined by the park-assist controller 120 to park the vehicle 100 into the parking spot 102. For example, the tire characteristics determined by the TPMS controller 118 include (i) a direction of travel, (ii) a road wheel angle, (iii) a clearance distance to object(s), and/or (iv) a road wheel distance to be traveled for each of the tires 114 along the parking path. Additionally or alternatively, the tire characteristics determined by the TPMS controller 118 include current charge levels of the TPMS sensors 116 and/or a durations of time since the TPMS sensors 116 most recently collected pressure measurements. Further, the TPMS controller 118 identifies whether there are any recent tire pressure alert(s) for one or more of the tires 114 of the vehicle 100. For example, the TPMS controller 118 identifies whether and for which of the tires 114 a low tire pressure alert and/or a high tire pressure alert has been emitted within a predetermined period of time prior to the current park-assist event.

Further, the TPMS controller 118 calculates tires indexes for the tires 114 based on their respective tire characteristics. For example, the TPMS controller 118 calculates a first tire index for the tire 114a based upon tire characteristic(s) of the tire 114a, a second tire index for the tire 114b based upon tire characteristic(s) of the tire 114b, a third tire index for the tire 114c based upon tire characteristic(s) of the tire 114c, and a fourth tire index for the tire 114d based upon tire characteristic(s) of the tire 114d. For example, the TPMS controller 118 increases a tire index of a tire for (i) a reverse direction of travel, (ii) low road wheel angles (e.g., corresponding with small turning radii for parking paths), (iii) small clearance distances to nearby objects, (iv) long distances of travel along parking paths, (v) low charge levels of the TPMS sensors 116, (vi) long durations of time between pressure measurement collections, and/or (vii) recent low and/or high tire pressure alerts. In some examples, the TPMS controller 118 weights the tire characteristics to calculate the tire indexes based on the tire characteristics. For example, the TPMS controller 118 emphasizes a tire characteristic by increasing its respective weight and deemphasizes a tire characteristic by decreasing its respective weight. Additionally or alternatively, the TPMS controller 118 calculates tires indexes for the tires 114 based on the presence of recent tire pressure alerts for the tires 114. For example, the TPMS controller 118 increases the tire index for one of the tires 114 if a low tire pressure alert and/or a high tire pressure alert was recently identified and emitted for that one of the tires 114.

The TPMS controller 118 of the illustrated example also determines whether to select the TPMS sensors 116 based on the tire indexes of the corresponding tires 114. That is, the TPMS controller 118 determines which of the TPMS sensors 116 is to collect a tire pressure measurement during the park-assist event. For example, to determine which of the TPMS sensors 116 to select, the TPMS controller 118 compares the tires indexes of the tires 114 to an index threshold. That is, the TPMS controller 118 compares the tire indexes to the index threshold to determine which of the TPMS sensors 116 are included in a selection of the TPMS sensors 116. For example, the TPMS controller 118 selects one of the TPMS sensors 116 in response to determining that the tire index of the corresponding one of the tires 114 is greater than the index threshold. Further, the TPMS controller 118 does not select one of the TPMS sensors 116 in response to determining that the tire index of the corresponding one of the tires 114 is less than the index threshold.

Upon selecting one or more of the TPMS sensors 116 based upon the tire indexes, the TPMS controller 118 instructs, via the TPMS communication module 117, the selected one(s) of the TPMS sensors 116 to collect pressure measurement(s) of the corresponding one(s) of the tires 114 during park-assist. For example, upon receiving an instruction from the TPMS controller 118, each of the selected one(s) of the TPMS sensors 116 collects a pressure measurement of the corresponding one of the tires 114 and sends the pressure measurement to the TPMS controller 118 (e.g., via the TPMS communication module 117).

In some examples, the TPMS controller 118 activates or wakes-up one or more (e.g., the selected one(s)) of the TPMS sensors 116 prior to sending the instruction. For example, the TPMS controller 118 sends a wake-up signal (e.g., a low frequency signal) to one or more of the TPMS sensors 116 via the TPMS communication module 117. Upon receiving the wake-up signal, those of the TPMS sensors 116 are paired with the TPMS communication module 117 for wireless communication. Subsequently, the TPMS controller 118 sends the instruction, via the TPMS communication module 117 (e.g., via ultra-high frequency, BLE, Bluetooth®, Wi-Fi®, UWB, etc.), to instruct one or more (e.g., the selected one(s)) of the TPMS sensors 116 the to collect tire pressure measurements from the corresponding one(s) of the tires 114.

In other examples, one-way beacon communication is utilized to instruct the selected one(s) of the TPMS sensors 116. In such examples, the wake-up signal is encoded with the instruction to collect a tire pressure measurement. In turn, those of the TPMS sensors 116 send corresponding acknowledgement signals to the TPMS communication module 117 and subsequently collect the tire pressure measurements. In some such examples, the TPMS controller 118 is configured to send the wake-up signal at regular interval (e.g., once every minute). In such examples, those of the TPMS sensors 116 are configured to remain active for a predefined time duration (e.g., 1 minute) and/or until a stop message is received within a subsequent signal.

Figure 3:
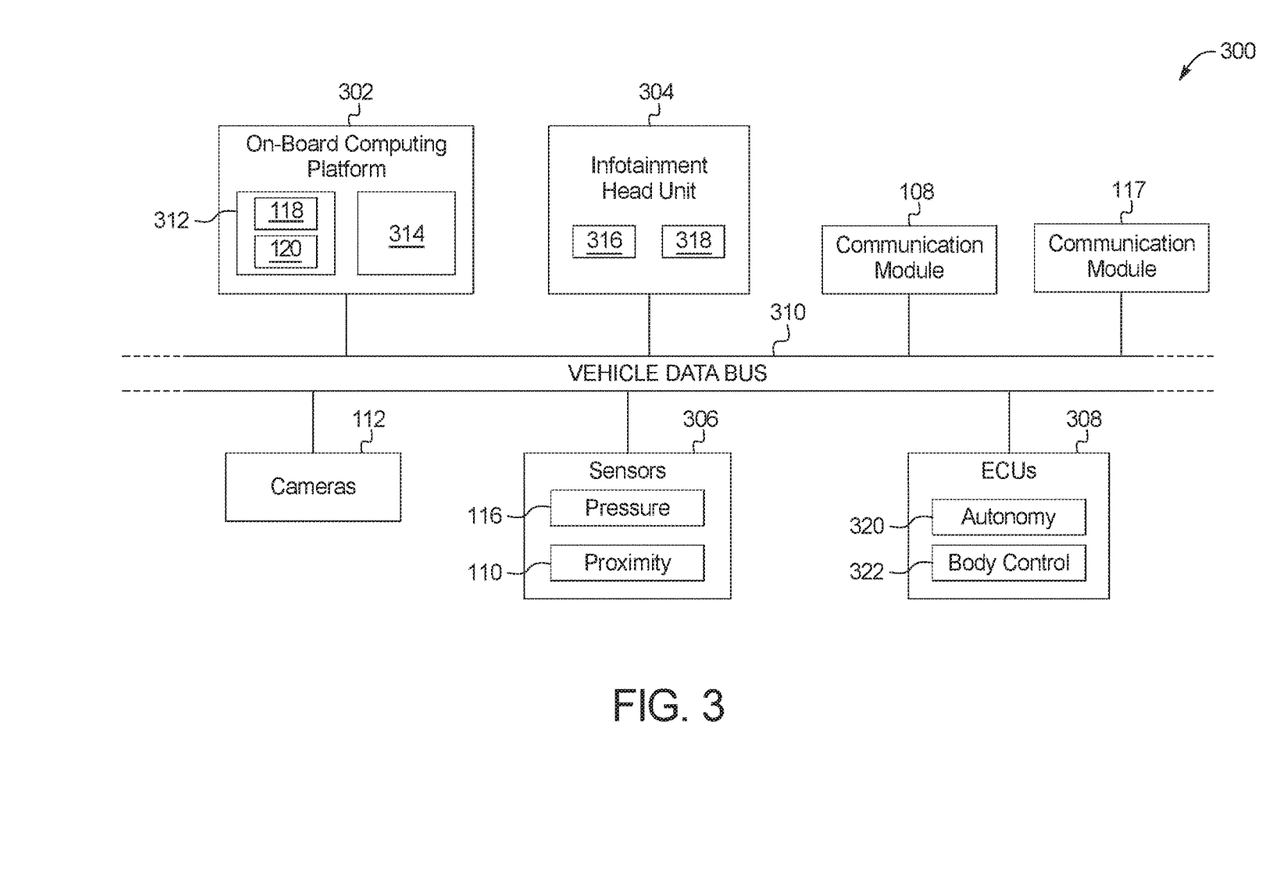
FIG. 3 is a block diagram of electronic components of the vehicle of FIG. 1.

In some examples, the TPMS controller 118 presents the collected tire pressure measurements to the user 104 (e.g., via the mobile device 106, via a display 316 of FIG. 3, via speakers 318 of FIG. 3). Additionally, or alternatively, the TPMS controller 118 determines whether to emit a low pressure alert and/or a high pressure alert based upon the collected tire pressure measurements. For example, the TPMS controller 118 compares the collected tire pressure measurements to a low pressure threshold and/or a high pressure threshold. The TPMS controller 118 emits a low tire pressure alert in response to determining that one or more of the collected tire pressure measurements is less than the low pressure threshold and/or emits a high tire pressure alert in response to determining that one or more of the collected tire pressure measurements is greater than the high pressure threshold.

Further, in some examples, the TPMS controller 118 normalizes the tire pressure measurements upon receiving the tire pressure measurements from one or more of the TPMS sensors 116. For example, the TPMS controller 118 normalizes the tire pressure measurements based upon an ambient temperature and/or barometric pressure (e.g., utilizing the ideal gas law). In such examples, the TPMS controller 118 compares the normalized measurements to the low and/or high tire pressure thresholds. Further, in some examples, the TPMS controller 118 calculates a change-in-pressure slope for one or more of the tires 114. In such examples, the TPMS controller 118 compares the change-in-pressure slope(s) to a threshold slope to determine whether to emit a tire pressure alert.

Figure 2:
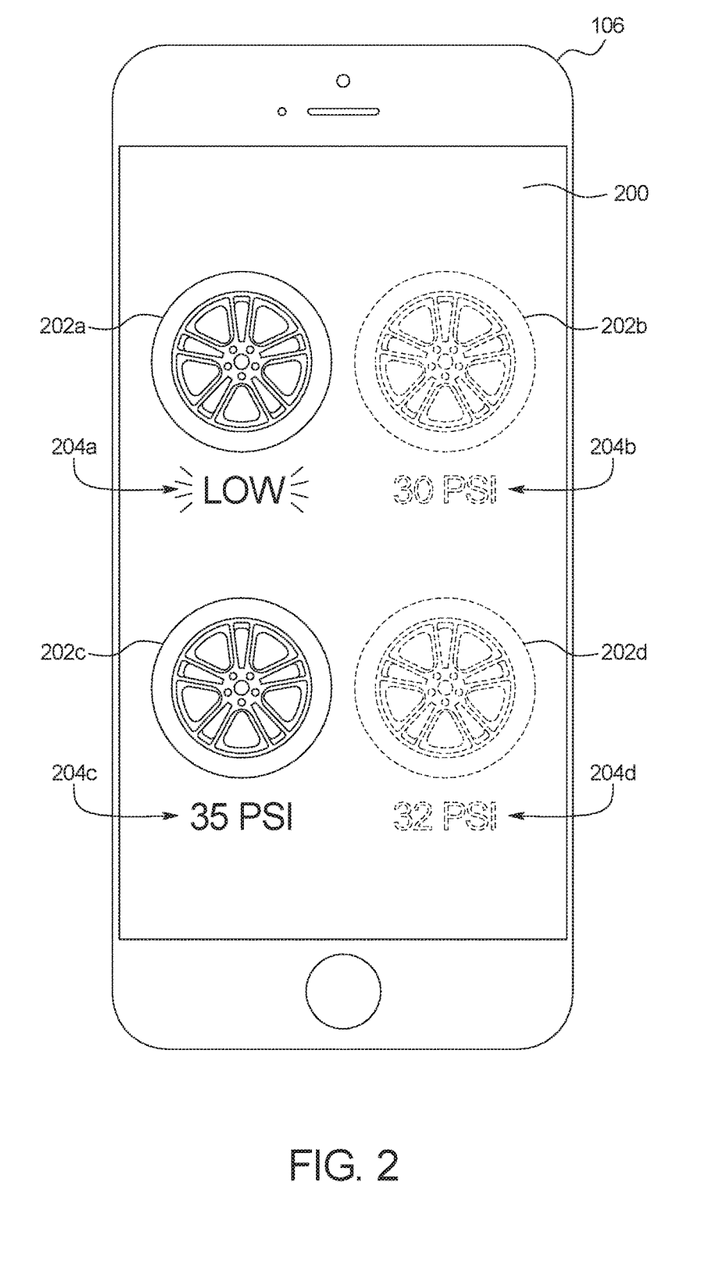
FIG. 2 illustrates an example tire pressure park-assist interface for a user in accordance with the teachings herein.

FIG. 2 illustrates an example interface 200 that is presented via the mobile device 106. As illustrated in FIG. 2, the interface 200 includes representations 202 of the tires 114 of the vehicle 100. For example, the interface 200 includes a representation 202a (e.g., a first representation, a first tire representation) of the tire 114a, a representation 202b (e.g., a second representation, a second tire representation) of the tire 114b, a representation 202c (e.g., a third representation, a third tire representation) of the tire 114c, and a representation 202d (e.g., a fourth representation, a fourth tire representation) of the tire 114d.

The interface 200 of the illustrated example includes pressure indicators 204 for the tires 114. For example, the interface 200 includes a pressure indicator 204a (e.g., a first pressure indicator, a first tire pressure indicator) for the tire 114a, a pressure indicator 204b (e.g., a second pressure indicator, a second tire pressure indicator) for the tire 114b, a pressure indicator 204c (e.g., a third pressure indicator, a third tire pressure indicator) for the tire 114c, and a pressure indicator 204d (e.g., a fourth pressure indicator, a first tire pressure indicator) for the tire 114a.

In the illustrated example, the pressure indicators 204 include tire pressure measurements of the tires 114. For example, the pressure indicator 204a identifies that the latest tire pressure measurement for the tire 114a includes a low-tire pressure alert, the pressure indicator 204b identifies that the latest tire pressure measurement for the tire 114b is 30 PSI, the pressure indicator 204c identifies that the latest tire pressure measurement for the tire 114c is 35 PSI, and the pressure indicator 204d identifies that the latest tire pressure measurement for the tire 114d is 32 PSI.

In the illustrated example, the representation 202a and the pressure indicator 204a of the tire 114a include solid lines, and the representation 202c and the pressure indicator 204c of the tire 114c include solid lines. Further, the representation 202b and the pressure indicator 204b of the tire 114b include dashed lines, and the representation 202d and the pressure indicator 204d of the tire 114d include dashed lines. The solid lines indicate that the most recent tire pressure measurements for the tires 114a, 114c were collected during the current park-assist event. That is, the TPMS controller 118 has instructed the TPMS sensors 116a, 116c of the tires 114a, 114c to collect measurements during the current park-assist event. Further, the dashed lines indicate that the most recent tire pressure measurements for the tires 114b, 114d were collected before the current park-assist event. That is, the TPMS controller 118 has not instructed the TPMS sensors 116b, 116d of the tires 114b, 114d to collect measurements during the current park-assist event. Additionally, or alternatively, the representations 202 and the pressure indicators 204 may include any other type of identifier (e.g., color codes) to indicate to the user 104 which measurements were collected during and/or before the current park-assist event.

FIG. 3 is a block diagram of electronic components 300 of the vehicle 100. As illustrated in FIG. 3, the electronic components 300 include an on-board computing platform 302, the infotainment head unit 304, the vehicle communication module 108, the TPMS communication module 117, the cameras 112, sensors 306, electronic control units (ECUs) 308, and a vehicle data bus 310.

The on-board computing platform 302 includes a microcontroller unit, controller or processor 312 and memory 314. In some examples, the processor 312 of the on-board computing platform 302 is structured to include the TPMS controller 118 and/or the park-assist controller 120. Alternatively, in some examples, the TPMS controller 118 and/or the park-assist controller 120 are incorporated into another electronic control unit (ECU) with its own processor 312 and memory 314. The processor 312 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 314 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 314 includes multiple kinds of memory, particularly volatile memory and non-volatile memory.

The memory 314 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 314, the computer readable medium, and/or within the processor 312 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 304 that provides an interface between the user 104 and the vehicle 100. The infotainment head unit 304 includes digital and/or analog interfaces (e.g., input devices and output devices) to receive input from and display information for the user(s). The input devices include, for example, a control knob, an instrument panel, a digital camera for image capture and/or visual command recognition, a touchscreen, an audio input device (e.g., cabin microphone), buttons, or a touchpad. The output devices may include instrument cluster outputs (e.g., dials, lighting devices), actuators, a display 316 (e.g., a heads-up display, a center console display such as a liquid crystal display (LCD), an organic light emitting diode (OLED) display, a flat panel display, a solid state display, etc.), and/or speaker(s) 318. The infotainment head unit 304 includes hardware (e.g., a processor or controller, memory, storage, etc.) and software (e.g., an operating system, etc.) for an infotainment system (such as SYNC® and MyFord Touch® by Ford®). Additionally, the display 316 of the infotainment head unit 304 is configured to display the infotainment system to the user 104.

The sensors 306 are arranged in and around the vehicle 100 to monitor properties of the vehicle 100 and/or an environment in which the vehicle 100 is located. One or more of the sensors 306 may be mounted to measure properties around an exterior of the vehicle 100. Additionally or alternatively, one or more of the sensors 306 may be mounted inside a cabin of the vehicle 100 or in a body of the vehicle 100 (e.g., an engine compartment, wheel wells, etc.) to measure properties in an interior of the vehicle 100. For example, the sensors 306 include accelerometers, odometers, tachometers, pitch and yaw sensors, wheel speed sensors, microphones, biometric sensors and/or sensors of any other suitable type. In the illustrated example, the sensors 306 include the TPMS sensors 116 that collect tire pressure measurements of the tires 114 and the proximity sensors 110 (e.g., radar sensors, LIDAR sensors, ultrasonic sensors, etc.) that detect and locate object(s) near the vehicle 100.

The ECUs 308 monitor and control the subsystems of the vehicle 100. For example, the ECUs 308 are discrete sets of electronics that include their own circuit(s) (e.g., integrated circuits, microprocessors, memory, storage, etc.) and firmware, sensors, actuators, and/or mounting hardware. The ECUs 308 communicate and exchange information via a vehicle data bus (e.g., the vehicle data bus 310). Additionally, the ECUs 308 may communicate properties (e.g., status of the ECUs 308, sensor readings, control state, error and diagnostic codes, etc.) to and/or receive requests from each other. For example, the vehicle 100 may have dozens of the ECUs 308 that are positioned in various locations around the vehicle 100 and are communicatively coupled by the vehicle data bus 310.

In the illustrated example, the ECUs 308 include an autonomy unit 320 and a body control module 322. For example, the autonomy unit 320 controls performance of autonomous and/or semi-autonomous driving maneuvers of the vehicle 100 based upon, at least in part, image(s) and/or video captured by the cameras 112, data collected by the proximity sensors 110, and/or instructions sent by the park-assist controller 120. For example, the autonomy unit 320 is configured to perform motive functions for park-assist (e.g., remote park-assist) of the vehicle 100. The body control module 322 controls one or more subsystems throughout the vehicle 100, such as power windows, power locks, an immobilizer system, power mirrors, etc. For example, the body control module 322 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 310 communicatively couples the vehicle communication module 108, the TPMS communication module 117, the cameras 112, the on-board computing platform 302, the infotainment head unit 304, the sensors 306, and the ECUs 308. In some examples, the vehicle data bus 310 includes one or more data buses. The vehicle data bus 310 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
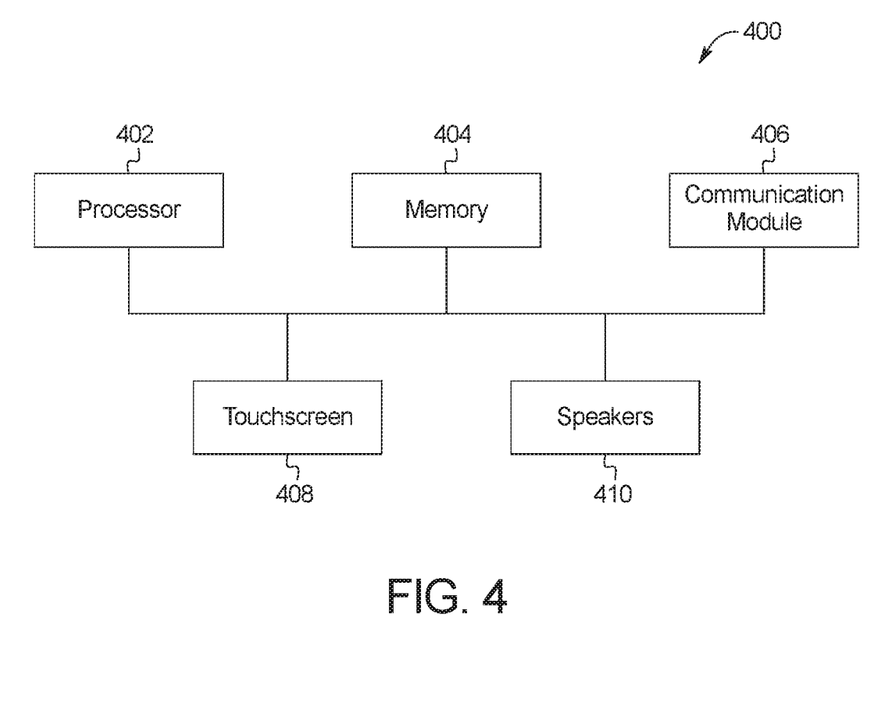
FIG. 4 is a block diagram of electronic components of the mobile device of FIG. 1.

FIG. 4 is a block diagram of electronic components 400 of the mobile device 106. As illustrated in FIG. 4, the electronic components 400 include a processor 402, memory 404, a mobile device communication module 406, a touchscreen 408, and speakers 410.

In the illustrated example, the processor 402 is any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). In some examples, the processor 402 is structured to include the TPMS controller 118 and/or the park-assist controller 120. The memory 404 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 404 includes multiple kinds of memory, particularly volatile memory and non-volatile memory.

The memory 404 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 404, the computer readable medium, and/or within the processor 402 during execution of the instructions.

Further, the mobile device communication module 406 includes wired or wireless network interfaces to enable communication with other devices and/or external networks. The external network(s) may be a public network, such as the Internet; a private network, such as an intranet; or combinations thereof, and may utilize a variety of networking protocols now available or later developed including, but not limited to, TCP/IP-based networking protocols. The mobile device communication module 406 also includes hardware (e.g., processors, memory, storage, antenna, etc.) and software to control the wired or wireless network interfaces. For example, the mobile device communication module 406 includes one or more communication controllers for cellular networks, such as Global System for Mobile Communications (GSM), Universal Mobile Telecommunications System (UMTS), Long Term Evolution (LTE), Code Division Multiple Access (CDMA). In the illustrated example, the mobile device communication module 406 includes a wireless personal area network (WPAN) module that is configured to wirelessly communicate with the vehicle communication module 108 of the vehicle 100 via short-range wireless communication protocol(s). In some examples, the mobile device communication module 406 implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally, or alternatively, the mobile device communication module 406 is configured to wirelessly communicate via Wi-Fi®, Near Field Communication (NFC), UWB (Ultra-Wide Band), and/or any other short-range and/or local wireless communication protocol (e.g., IEEE 802.11 a/b/g/n/ac) that enables the mobile device communication module 406 to communicatively couple to the vehicle communication module 108 of the vehicle 100.

The touchscreen 408 of the illustrated example provides an interface (e.g., the interface 200 of FIG. 2) between the user 104 and the mobile device 106 to enable the user 104 to initiate remote park-assist features via the mobile device 106. For example, the touchscreen 408 is a resistive touchscreen, a capacitive touchscreen, and/or any other type of touchscreen that displays output information to and tactilely receives input information from the user 104 of the mobile device 106. In some examples, the mobile device 106 also includes other input devices (e.g., buttons, knobs, microphones, etc.) to receive input information from the user 104 and/or output devices, such as the speakers 410, to provide output information to the user 104 of the mobile device 106. Based on input information received from the user 104 via the touchscreen 408 and/or other input device, the mobile device communication module 406 of the mobile device 106 wirelessly communicates with the vehicle communication module 108 of the vehicle 100 to initiate motive functions of the vehicle 100 for remote park-assist.

Figure 5:
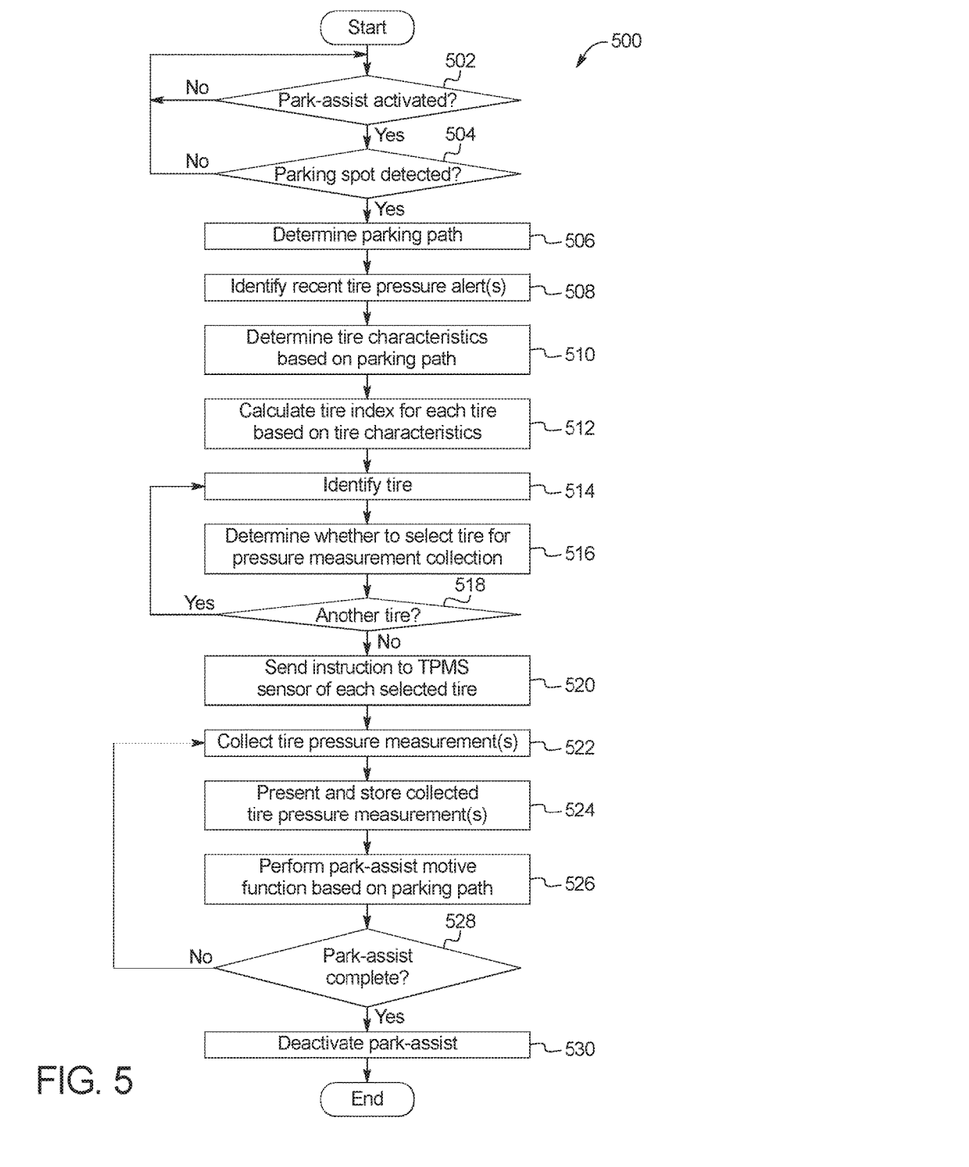
FIG. 5 is a flowchart for monitoring tire pressures with vehicle park-assist in accordance with the teachings herein.

FIG. 5 is a flowchart of an example method 500 to monitor tire pressures with vehicle park-assist. The flowchart of FIG. 5 is representative of machine readable instructions that are stored in memory (such as the memory 314 of FIG. 3) and include one or more programs which, when executed by a processor (such as the processor 312 of FIG. 3), cause the vehicle 100 to implement the example TPMS controller 118 and/or the example park-assist controller 120 of FIGS. 1 and 3. While the example program is described with reference to the flowchart illustrated in FIG. 5, many other methods of implementing the example TPMS controller 118 and/or the example park-assist controller 120 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the park-assist controller 120 determines whether park-assist is activated. In response to the park-assist controller 120 determining that park-assist is not active, the method 500 remains at block 502. Otherwise, in response to the park-assist controller 120 determining that park-assist is active, the method 500 proceeds to block 504 at which the park-assist controller 120 determines whether an available parking spot (e.g., the parking spot 102 of FIG. 1) has been detected. In response to the park-assist controller 120 not detecting an available parking spot, the method 500 returns to block 502. Otherwise, in response to the park-assist controller 120 detecting an available parking spot, the method 500 proceeds to block 506 at which the park-assist controller 120 determines a parking path into the available parking spot. For example, the park-assist controller 120 determines the parking path based upon data collected by the proximity sensors 110 and/or image(s) and/or video collected by the cameras 112.

At block 508, the TPMS controller 118 identifies whether there are any recent tire pressure alert(s) for one or more of the tires 114 of the vehicle 100. For example, the TPMS controller 118 identifies whether a low tire pressure alert and/or a high tire pressure alert has been emitted within a predetermined period of time prior to a current park-assist event. If a tire pressure alert is identified, the TPMS controller 118 identifies for which of the tires 114 the alert was emitted.

At block 510, the TPMS controller 118 identifies tire characteristic(s) of the tires 114 of the vehicle 100 based upon the parking path determined at block 506. For example, the TPMS controller 118 determines (i) a direction of travel, (ii) a road wheel angle, (iii) a clearance distance to object(s), and/or (iv) a road wheel distance to be traveled for each of the tires 114 along the parking path. Additionally, or alternatively, the TPMS controller 118 determines current charge levels of the TPMS sensors 116 and/or a durations of time since the TPMS sensors 116 collected most recent pressure measurements.

At block 512, the TPMS controller 118 calculates tires indexes for the tires 114 based on the tire characteristics determined at block 510 and/or recent tire pressure alerts identified at block 508. For example, the TPMS controller 118 a respective tire index for each of the tires 114 based upon the tire characteristic(s) and/or recent tire pressure alert(s) of that tire.

At block 514, the TPMS controller 118 identifies one of the tires (e.g., the tire 114a). At block 516, the TPMS controller 118 determines whether to select the identified tire, based on its tire index, for collection of a tire pressure measurement while the park-assist is active. For example, the TPMS controller 118 selects the identified tire for tire pressure measurement collection during the park-assist event when its tire index is greater than or equal to a predetermined index threshold. At block 518, the TPMS controller 118 determines whether there is another of the tires 114 during the active park-assist event. In response to the TPMS controller 118 determining that there is another of the tires 114 (e.g., tire 114b, the tire 114c, the tire 114d), the method 500 returns to block 514 for the other of the tires 114. Otherwise, in response to the TPMS controller 118 determining that there is not another of the tires 114, the method 500 proceeds to block 520.

At block 520, the TPMS controller 118 sends an instruction to the TPMS sensors 116 that correspond to the selected one(s) of tires 114 to collect a tire pressure measurement while park-assist is active. For example, the TPMS controller 118 sends the instruction via the TPMS communication module 117. At block 522, the TPMS controller 118 collects tire pressure measurements of the tires 114 designated for collection and instructs the TPMS sensors 116 of the other of the tires 114 not to collect or transmit tire pressure measurements. For example, for each of the tires 114 selected at block 516, the corresponding one of the TPMS sensors 116 measure a current tire pressure while park-assist is active and subsequently sends the tire pressure measurement to the TPMS controller 118 while park-assist remains active. In some examples, for each of the tires 114 selected at block 516, the TPMS controller 118 collects the most recently collected tire pressure measurement (e.g., stored in the memory 314 of FIG. 3). At block 524, the TPMS controller 118 presents the tire pressure measurement for each of the tires 114 via a display (e.g., touchscreen 408 of the mobile device 106, the display 316 of the vehicle 100). Additionally, the TPMS controller 118 stores (e.g., in the memory 314 of FIG. 3) the tire pressure measurement for each of the tires 114 for later use.

At block 526, the park-assist controller 120 performs park-assist motive function(s) of the vehicle 100 based on the determined travel path. That is, the park-assist controller 120 performs motive function(s) to cause the vehicle 100 to travel along the travel path determined at block 506 into the parking spot detected at block 504. At block 526, the park-assist controller 120 determines whether the park-assist event is complete. For example, the park-assist controller 120 determines whether the vehicle 100 is parked at a target position within the detected parking spot. In response to the park-assist controller 120 determining that the park-assist event is not complete, the method 500 returns to block 522 to collect additional tire pressure measurements. For example, the TPMS sensors 116 of the selected ones of the tires 114 collect tire pressure measurements while park-assist is active at predetermined time intervals (e.g., every 30 seconds) and/or at predetermined events (e.g., before starting the motive function(s), upon entering the parking spot, after each forward or reverse motion, upon being parked within the parking spot). In response to the park-assist controller 120 determining that the park-assist event is complete, the method 500 proceeds to block 530 at which the park-assist controller 120 deactivates park-assist for the vehicle 100.

An example disclosed vehicle includes tires, tire pressure monitoring system (TPMS) sensors, a park-assist controller to determine a parking path, and a TPMS controller. The TPMS controller is to determine tire characteristics based on the parking path, calculate tire indexes for the tires based on the tire characteristics, and select one or more of the TPMS sensors based on the tire indexes. The TPMS controller also is to instruct, via a communication module, the selected TPMS sensors to collect pressure measurements during park-assist.

Some examples further include an autonomy unit to perform motive functions for the park-assist. Some examples further include at least one of a proximity sensor and a camera that enable the park-assist controller to determine the parking path. In some examples, each of the tires includes a corresponding one of the TPMS sensors.

In some examples, upon receiving an instruction from the TPMS controller, each of the selected TPMS sensors collects one of the pressure measurements and sends that one of the pressure measurements to the TPMS controller via the communication module. In some examples, upon receiving the pressure measurements from the selected TPMS sensors, the TPMS controller normalizes the pressure measurements based upon at least one of an ambient temperature and a barometric pressure. In some examples, upon receiving the pressure measurements from the selected TPMS sensors, the TPMS controller is to calculate a change-in-pressure slope for each of the tires corresponding to the selected TPMS sensors and emit a tire pressure alert in response to determining that at least one of calculated change-in-pressure slopes is greater than a threshold slope.

In some examples, by causing only the selected TPMS sensors to collect the pressure measurements during the park-assist, the TPMS controller reduces an amount of wireless communication being transmitted and processed while the park-assist is active.

In some examples, the TPMS controller weights the tire characteristics to calculate the tire indexes based on the tire characteristics. In some examples, the TPMS controller compares the tire indexes to an index threshold to determine which of TPMS sensors are included in the selected TPMS sensors.

In some examples, for each of the tires, the tire characteristics include a direction of travel along the parking path. In some examples, for each of the tires, the tire characteristics include a road wheel angle along the parking path. In some examples, for each of the tires, the tire characteristics include a clearance distance to an object along the parking path. In some examples, for each of the tires, the tire characteristics include a road wheel distance to be traveled along the parking path. In some examples, for each of the tires, the tire characteristics include a current charge level of a corresponding one of the TPMS sensors. In some examples, for each of the tires, the tire characteristics include a duration of time since a corresponding one of the TPMS sensors collected a most recent pressure measurement. In some examples, for each of the tires, the TPMS controller further calculates a corresponding one of the tire indexes based on a presence of a recent tire pressure alert.

Some examples further include a second communication module configured to wirelessly communicate with a mobile device of a user. The park-assist is remote park-assist initiated by the mobile device.

An example disclosed method includes determining, via a processor, a parking path for a vehicle. The example disclosed method also includes determining tire characteristics of tires of the vehicle based on the parking path, calculating a tire index for each of the tires based on the tire characteristics, and selecting one or more of the TPMS sensors based on the tire indexes. The example disclosed method also includes instructing, via a communication module, the selected TPMS sensors to collect pressure measurements during park-assist.

Some examples further include, for each of the selected TPMS sensors, collecting one of the pressure measurements for a corresponding one of the tires and sending that one of the pressure measurements to the communication module.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities. A "module," a "unit," and a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   tires;
   tire pressure monitoring system (TPMS) sensors;
   a park-assist controller to determine a parking path; and
   a TPMS controller to:
      determine tire characteristics based on the parking path;
      calculate tire indexes for the tires based on the tire characteristics;
      select one or more of the TPMS sensors based on the tire indexes; and
      instruct, via a communication module, the selected TPMS sensors to collect pressure measurements during park-assist.

2. The vehicle of claim 1, further including an autonomy unit to perform motive functions for the park-assist.

3. The vehicle of claim 1, further including at least one of a proximity sensor and a camera that enable the park-assist controller to determine the parking path.

4. The vehicle of claim 1, wherein each of the tires includes a corresponding one of the TPMS sensors.

5. The vehicle of claim 1, wherein, upon receiving an instruction from the TPMS controller, each of the selected TPMS sensors collects one of the pressure measurements and sends that one of the pressure measurements to the TPMS controller via the communication module.

6. The vehicle of claim 1, wherein, upon receiving the pressure measurements from the selected TPMS sensors, the TPMS controller normalizes the pressure measurements based upon at least one of an ambient temperature and a barometric pressure.

7. The vehicle of claim 1, wherein, upon receiving the pressure measurements from the selected TPMS sensors, the TPMS controller is to:
   calculate a change-in-pressure slope for each of the tires corresponding to the selected TPMS sensors; and
   emit a tire pressure alert in response to determining that at least one of calculated change-in-pressure slopes is greater than a threshold slope.

8. The vehicle of claim 1, wherein, by causing only the selected TPMS sensors to collect the pressure measurements during the park-assist, the TPMS controller reduces an amount of wireless communication being transmitted and processed while the park-assist is active.

9. The vehicle of claim 1, wherein, the TPMS controller weights the tire characteristics to calculate the tire indexes based on the tire characteristics.

10. The vehicle of claim 1, wherein the TPMS controller compares the tire indexes to an index threshold to determine which of TPMS sensors are included in the selected TPMS sensors.

11. The vehicle of claim 1, wherein, for each of the tires, the tire characteristics include a direction of travel along the parking path.

12. The vehicle of claim 1, wherein, for each of the tires, the tire characteristics include a road wheel angle along the parking path.

13. The vehicle of claim 1, wherein, for each of the tires, the tire characteristics include a clearance distance to an object along the parking path.

14. The vehicle of claim 1, wherein, for each of the tires, the tire characteristics include a road wheel distance to be traveled along the parking path.

15. The vehicle of claim 1, wherein, for each of the tires, the tire characteristics include a current charge level of a corresponding one of the TPMS sensors.

16. The vehicle of claim 1, wherein, for each of the tires, the tire characteristics include a duration of time since a corresponding one of the TPMS sensors collected a most recent pressure measurement.

17. The vehicle of claim 1, wherein, for each of the tires, the TPMS controller further calculates a corresponding one of the tire indexes based on a presence of a recent tire pressure alert.

18. The vehicle of claim 1, further including a second communication module configured to wirelessly communicate with a mobile device of a user, wherein the park-assist is remote park-assist initiated by the mobile device.

19. A method comprising:
   determining, via a processor, a parking path for a vehicle;
   determining tire characteristics of tires of the vehicle based on the parking path;

calculating a tire index for each of the tires based on the tire characteristics;

selecting one or more of the TPMS sensors based on the tire indexes; and instructing, via a communication module, the selected TPMS sensors to collect pressure measurements during park-assist.

20. The method of claim 19, further including, for each of the selected TPMS sensors, collecting one of the pressure measurements for a corresponding one of the tires and sending that one of the pressure measurements to the communication module.

\* \* \* \* \*